Jan. 27, 1931. U. BISCHOF 1,790,401
THREAD KNOTTING DEVICE
Filed May 29, 1929   7 Sheets-Sheet 4
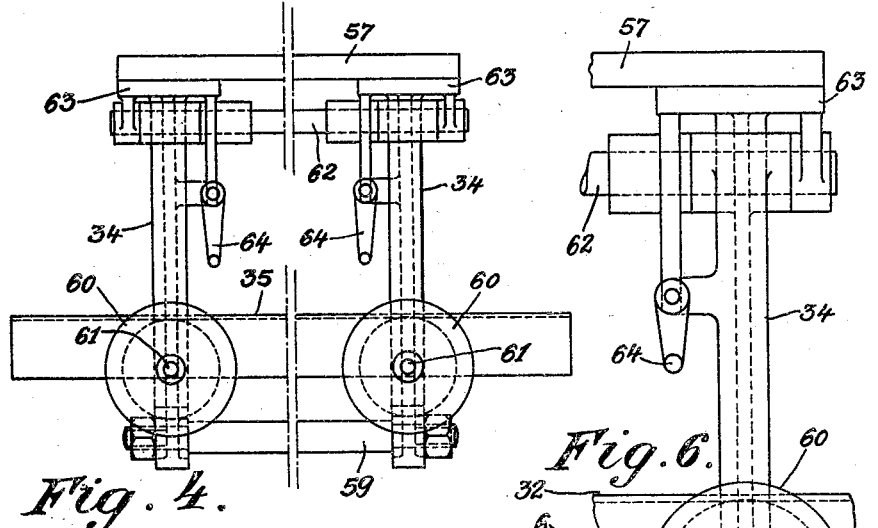
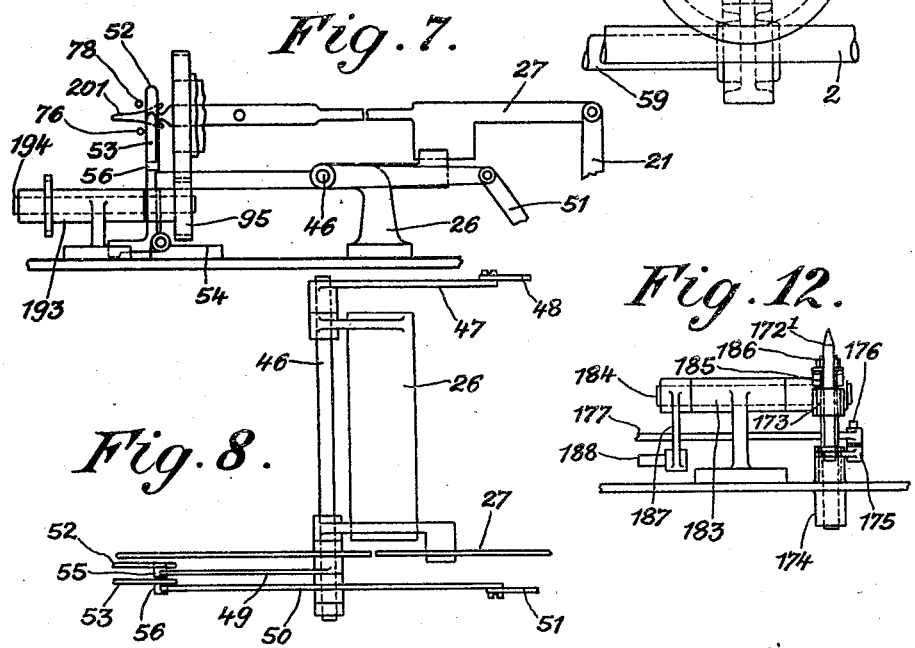

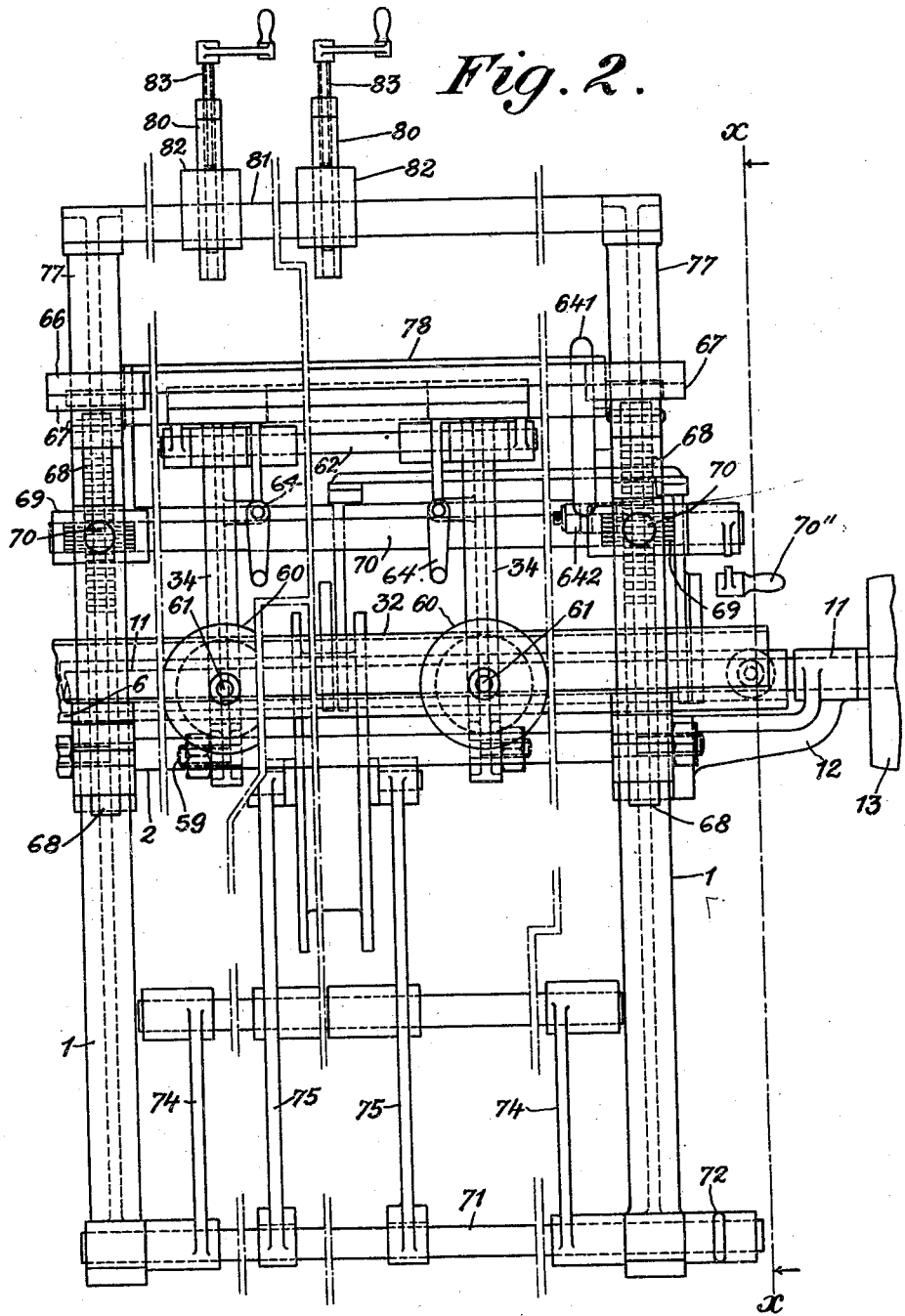

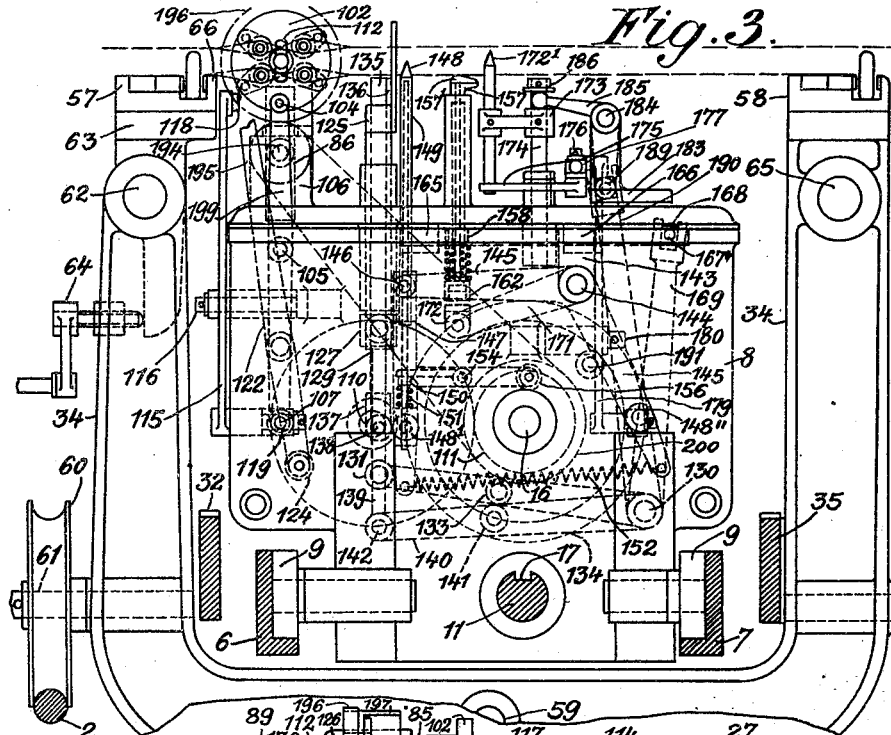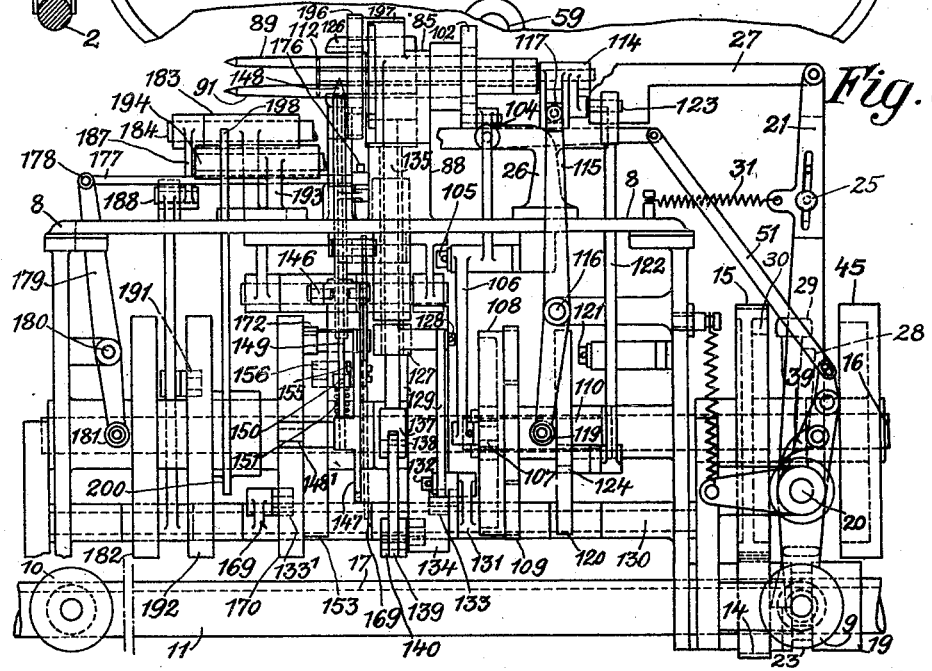

Jan. 27, 1931. U. BISCHOF 1,790,401
THREAD KNOTTING DEVICE
Filed May 29, 1929 7 Sheets-Sheet 5
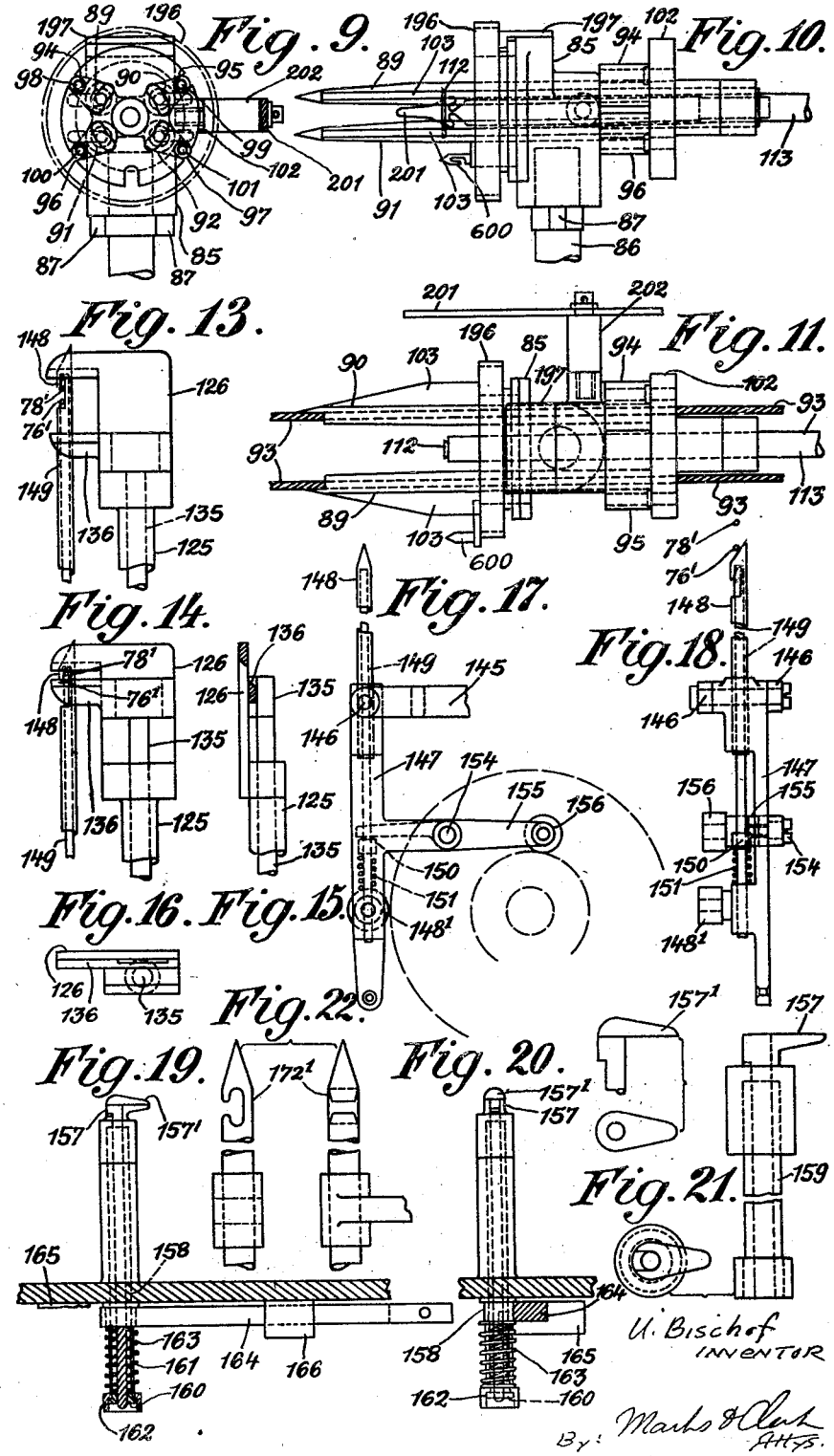

Jan. 27, 1931. U. BISCHOF 1,790,401
THREAD KNOTTING DEVICE
Filed May 29, 1929 7 Sheets-Sheet 6

U. Bischof
INVENTOR

By Marks & Clark
Attys.

Jan. 27, 1931.  U. BISCHOF  1,790,401
THREAD KNOTTING DEVICE
Filed May 29, 1929    7 Sheets-Sheet 7

Patented Jan. 27, 1931

1,790,401

UNITED STATES PATENT OFFICE

ULRICH BISCHOF, OF AARAU, SWITZERLAND

THREAD-KNOTTING DEVICE

Application filed May 29, 1929, Serial No. 367,025, and in Switzerland October 4, 1928.

Warp tying devices hitherto known exhibit the disadvantage that during the tying of threads of different thicknesses the same are not always held fast with complete security by the known binding bills for instance, and the latter therefore give rise to disturbances.

In other known tying devices, thread-gripping devices revolving round the mandril are provided, the grip of which upon the threads should only be so strong that in winding the thread round the mandril this thread can be drawn after by the gripper. In these devices the threads cannot be securely held and therefore disturbances are likely to occur.

There are also tying devices known in which, after the winding round has been effected, a hook is pushed through the interlacing loop, and seizes the thread end held by the gripper and pulls it through the loop, but the jumping of the thread ends out of the hook when leaving the gripper is not precluded.

Now the present invention relates to a warp-tying device, which eliminates the above-mentioned disadvantages, owing to the fact that the binding bill has two key-like jaw members, and one of these members is fixedly mounted with a pierced boss upon a rotatably arranged tube constructed with teeth, in which tube is slidably arranged a rod which has at one end a co-acting jaw, which is pressed against the first jaw by two springs of different strengths arranged upon the opposite side of the rod, whereby a closed binding bill is formed, which is suitable for effecting the binding and holding fast of the thread ends with the utmost security whatever their thickness, the springs of said binding bill completely gripping the thread during the tying, while after the knotting has been effected a light braking is applied for the purpose of holding the thread ends in such a way that the thread ends can be pulled out of the binding bill under tension.

Moreover a bush fixedly mounted upon the co-acting jaw rod and provided with a projection and with the weaker spring, preferably carries in a displaceable manner, at one end of the said rod a second bush, likewise provided with a projection, and provided with the stronger spring, in such a way that the stronger spring together with the weaker spring arranged directly upon the rod of the co-acting jaw, produces a completely fast gripping of the threads in the binding bill, in which case, after the knotting has been effected during the subsequent displacing of the bush provided with the stronger spring, the complete gripping of the threads is eliminated and the thread ends are therefore held in the binding bill merely by the weaker spring without excessive tension, and can be withdrawn from the said binding bill. In this way an exceedingly reliable and rapid method of working is obtainable with a maximum output. The thread ends to be tied by the binding bill are preferably seized and held fast by a slidably and rockably arranged needle-shaped thread gripper, while a tube is constructed at one end as a hook-needle with a closed point, the said tube having in its bore a longitudinally slidable rod that presses resiliently against the neck of the hook, which rod, together with the tube, forms a needle-shaped thread gripper and at the same time a hooked needle, in such a way that a completely reliable holding of the thread ends is obtained with all thicknesses of thread. The hooked needle preferably has a one-sided point for the purpose of guiding the threads by means of this point during a longitudinal displacement of the hooked needle into the hook thereof and gripping them firmly.

For the seizing of the threads, and for the purpose of feeding them to the binding bill, there is preferably arranged besides the needle-shaped thread gripper a second needle approximately in axial alignment with the binding bill and the thread gripper upon the opposite side of the binding bill, this needle being carried in an oscillatably and slidably arranged holder and moving with it, for the purpose of seizing and supplying the thread held fast by the gripper at a second place upon the other side of the binding bill, the same needle, after the tying of the threads, pulling the tied threads out of reach of the tying implements by its swinging movement and lying them down.

This needle preferably has two hooks on the same side facing one another, whereby a seizing and reciprocating of the threads during the looping and knotting, as well as the depositing of the knotted threads by the same needle, are effected.

The knotting implements are preferably arranged upon a displaceable carriage, which is preferably displaced by a ratchet mechanism, a second ratchet mechanism being preferably arranged, separately from the first, for the displacement of the usual warp carriage. The two ratchet mechanisms are preferably arranged upon a common shaft journalled on the carriage of the knotting implements, a coupling lever for the engagement and disengagement of the thread knotting device being preferably arranged upon the same shaft. The coupling lever is preferably constructed as a two-armed lever, one arm preferably engaging in a longitudinally slidable coupling member located upon the driving shaft, whereas the other arm is pivotally connected with a feeler located in a guide, and, in conjunction with a stop motion, throws the knotting device out of operation when a thread fails.

One constructional example of the invention is illustrated in the accompanying drawings, in which Figure 1 shows the apparatus in side elevation, some parts being shown in section, and Figure 2 shows it in front elevation, that is, as seen in the direction of the arrow in Figure 1, a second machine being partly indicated.

Figure 3 shows a side view of the warp carriage with the knotting device, individual parts being shown in section on the lines x—x in Figure 2, Figure 4 is a front view of the warp carriage, Figure 5 shows the knotting device with the driving shaft in front elevation, Figure 6 shows a part of the warp carriage.

Figure 7 is a front elevation of the arrangement of the keys, stop motion and coupling and ratchet lever mechanism associated therewith.

Figure 8 is a plan of the keys, stop motion and coupling and ratchet lever mechanism associated therewith.

Figure 9 is a side elevation of the thread-removing means and

Figure 10 is a front elevation thereof.

Figure 11 is a plan of the thread-removing means.

Figure 12 is a front elevation of the arrangement of the needle and its operating members.

Figure 13 is a side elevation of the shears with the gripping needle and thread.

Figure 14 is a side elevation of the shears in almost closed position with the gripping needle and gripped threads.

Figure 15 is a front elevation of the shears and

Figure 16 a plan thereof.

Figure 17 is a side elevation of the gripping needle means and

Figure 18 is a front elevation thereof.

Figure 19 is a side elevation of the knotting plate, broken away, with binding bill and rack and Figure 20 is a front elevation thereof.

Figure 21 is a side elevation of the bush or sleeve with rack and the lower part of the binding bill also a plan thereof and a side elevation and plan of the upper part of the binding bill.

Figure 22 shows the needle in front elevation and side elevation respectively.

Figure 27:
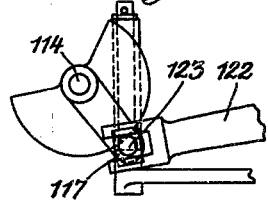
Figure 26:
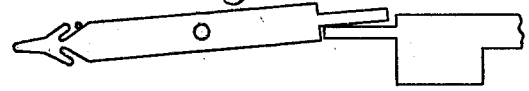

Figures 23–26 show the various positions of the stop motion relative to the push rod and Figure 27 is a side elevation of a detail of the thread-removing means.

Figures 28 to 32 show the tying of the threads.

Figure 1:
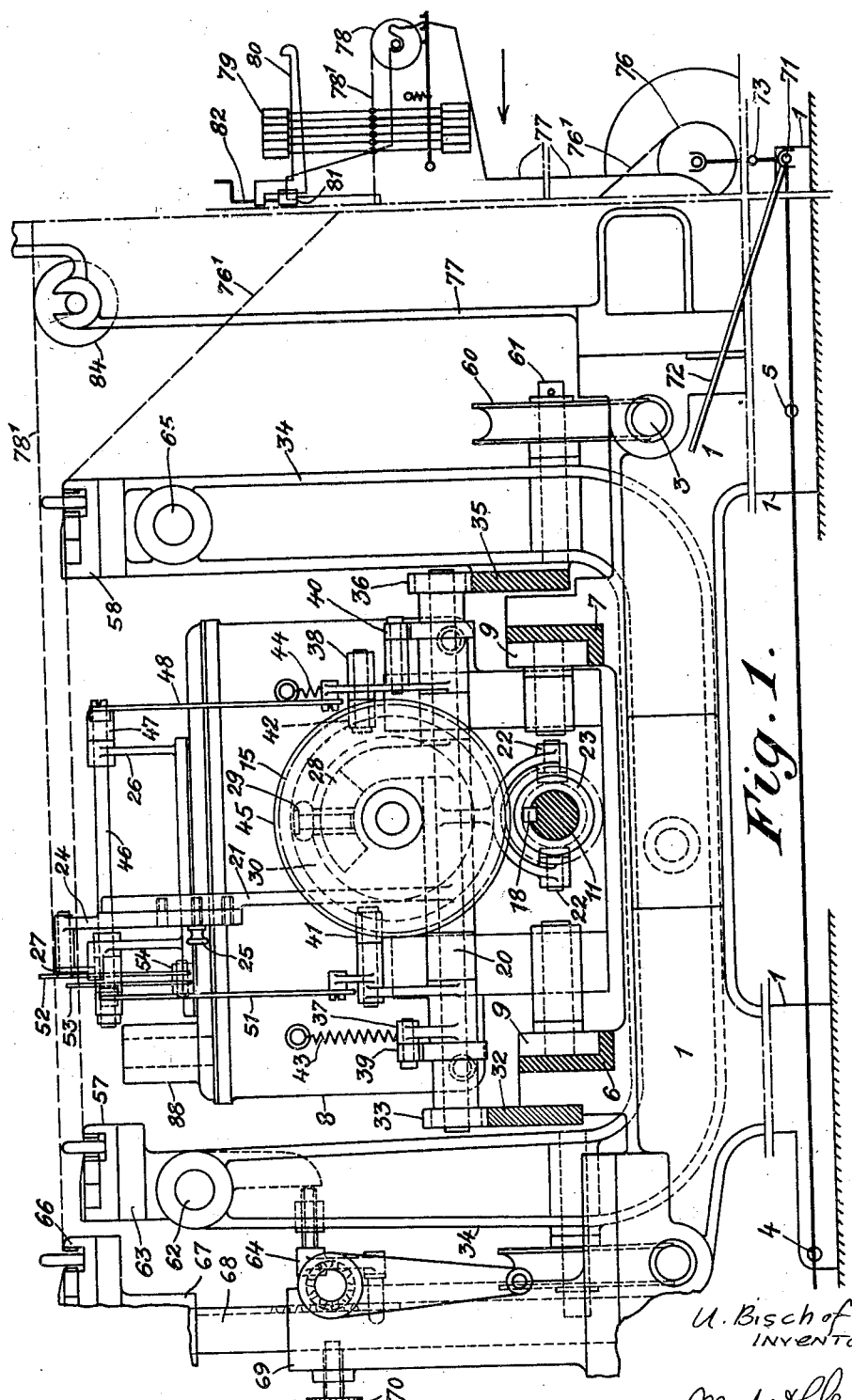
Figure 23:
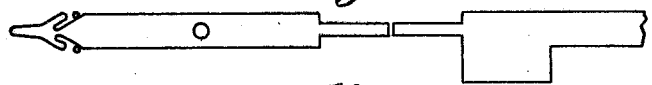
Figure 24:
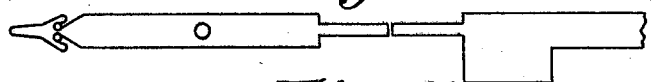
Figure 25:

In Figures 1 and 2, 1 denotes the side frames of the machine, which is braced by connecting rods 2, 3, 4 and 5. To the side frames are secured running rails 6 and 7, upon which are mounted rollers 9 and 10, rotatably arranged on the knotting carriage 8 and facilitating the displacement thereof. A driving shaft 11 is journalled in bearings 12 secured to the side frames, and carries at one end a driving pulley 13. The shaft 11 carries a toothed wheel 14 (Figure 5), which meshes with a second toothed wheel 15, of which the shaft 16, arranged on the knotting carriage 8, carries the discs furnished with cam grooves, not shown, for actuating the knotting implements.

The driving shaft 11 has a groove or key-way 17 (Figure 3), in which there engages a key 18 (Fig. 1) of a clutch 19 (Fig. 5) arranged beside the wheel 14. On the knotting carriage is arranged a shaft 20 (Figs. 1 and 5), upon which is oscillatably supported a two-armed lever 21, one arm engaging with the jaws 22 in a groove 23 of the clutch 19 and the other arm being constructed in two parts. The part 24 is slidably and clampably arranged on the other part of the lever 21 by means of a slot and a screw 25 (Fig. 1), the part 24 being brought into its lowest position for the purpose of sliding the knotting carriage backwards by hand underneath the previously mounted fresh warp of the first machine, when the said carriage is to be brought into its lateral initial position. The part 24 is pivotally connected with a feeler 27 guided in a bracket 26. The double-armed lever 21 is also connected with a braking arm 28 (Fig. 1), the roller 29 of which is drawn to the cam disc 30 by a spring 31.

Upon one end of the shaft 20 is rotatably arranged a toothed wheel 33 (Fig. 1) meshing with a rack 32 secured to the side frames, while upon the opposite end of the shaft 20 is provided a toothed wheel 36 meshing with a rack 35 secured to downwardly bent bows 34 (Figs. 1, 2 and 3). Ratchet levers 37 and 38 bearing upon these wheels are mounted loose upon the shaft 20, and their pawls 39 and 40 each engage in a second set of teeth in the tooth wheels 33 and 36. The rollers 41 and 42 of the ratchet levers 37 and 38 are pressed by springs 43 and 44 on to the same cam groove, not shown, in a disc 45. In the bracket 26 (Figs. 1, 7 and 8) is journalled a shaft 46, on one end of which is mounted fast a lever 47, which is pivotally connected by a tension rod 48 with the ratchet lever 38, while upon the other side of the shaft 46 is secured a lever 49. Beside this lever there is oscillatably arranged upon the shaft 46 a lever 50, which is pivotally connected by a tension rod 51 with the ratchet lever 37. Keys 52 and 53 (Figs. 1, 7 and 8) are oscillatably arranged in a bracket 54 and are constructed with projections 55 and 56, under which the ends of the levers 49 and 50 are located. The keys 52 and 53 bear on the warp threads and take up during the tying of the threads a variable position, in such a way that the projections 55 and 56 on the keys stand at times before the ends of the levers 49 and 50, and therefore these levers are no longer checked in their freedom of movement and the ratchet mechanisms connected therewith come into operation, on the one hand for displacing the knotting carriage, relatively to the warp, and on the other hand for the purpose of displacing the warp carriage to equalize the correct positioning of the two warps one above the other. The keys 52 and 53 bearing on the threads return into the initial position owing to this displacement of the knotting carriage and the operation of the ratchet mechanisms and of the levers 49 and 50 is thereby interrupted again, and this series of operations is always repeated in an alternating manner.

The grippers 57 and 58 (Figs. 1 and 3), known in themselves, are carried by the downwardly bent bows 34, the latter being connected with one another by a rod 59 and forming, together with rollers 60 rotatably arranged upon pivots 61 secured in the bows, a travelling warp carriage. The gripper 57 is movably arranged in a known manner, the latter being carried by a shaft 62 journalled in the bows 34 and a bracket 63 fixedly mounted upon the said shaft, a crank 64 (Figs. 3 and 4) bearing on each side upon a stop on each support 63. Underneath the gripper 58 is provided a rod 65 (Figs. 1 and 3) as a connecting member for the bows 34. The gripper 66 (Figs. 1 to 3) bears upon the two brackets 67 which are provided with racks 68, and which are slidably supported in brackets 69 secured to the side frames 1 of the machine and fastened by screws 70. In the bracket 69 is mounted a toothed shaft 70', the teeth of which engage the racks 68; a hand crank 70'' is secured to the shaft 70' and the gripper 66 can be lowered by turning the said crank in order that the threads may be better gripped by the gripper 57. In the side frames 1 is supported a shaft 71 (Figs. 1 and 8), upon which is mounted fast a hand lever 72, while a pivot 73 is immovably carried by levers 74 mounted fast upon the shaft 71. Further levers 75 located upon the pivot 73 are two-armed levers and are displaceably arranged upon the pivot 73 in such a way that the downwardly directed arms of these levers engage over the shaft 71, whereby these levers are guided. The upper arms of the levers 75 carry the beam 76 with the fresh warp 76'. To the side frames 1 (Figs. 1 and 2) are secured brackets 77 carrying a beam 78 with the old warp 78', harness 79 provided with the old warp being suspended from holders 80. Upon a rail 81 secured to the brackets 77 two holder guides 82 are longitudinally slidable, in which the holders 80 are so arranged by means of a screw 83 in each case, as to be adjustable in height. Above a cylinder 84 which is so arranged as to be rotatable in the brackets 77 and readily removable, the old warp, carried by the harness, firmly gripped in the space 78 in a known manner, is guided forward for tying.

A tube holder 85 (Figs. 5, 9, 10 and 11), with pivot 86 and cams 87, is inserted into the bore of a boss 88 (Figs. 1, 3 and 5), the cams 87 engaging in a slot in this boss 88, and thereby giving the correct position to the tube holder 85. In the tube holder are rotatably arranged tubes 89, 90, 91 and 92, in the bores of which so-called cords 93 (Fig. 11) are pulled through in a known manner, the warps lying cross-wise above the latter, and the threads being taken away individually. To the tubes are fastened levers 94, 95, 96 and 97, and pins 98, 99, 100 and 101 rotatably arranged therein engage in a common disc 102 rotatably arranged upon the holder 85 and set in oscillation during a revolution of this disc longitudinal ribs 103 formed on the tubes. For the rotating of this disc 102 there engages in a slot therein a pin 104 (Figs. 3 and 5) on a lever 106, which is arranged on the knotting carriage 8, and is rotatable upon a pin 105, while a roller 107 fitted to the other end of the lever 106 engages in a cam groove, not shown, in a disc 108, and during the rotation of this disc sets in oscillation the longitudinal ribs 103 formed on the tubes. The disc 108 is constructed with a toothed wheel 109 and journalled upon a pin 110, the toothed wheel meshing with a toothed wheel 111 secured to the shaft 16. On the tube holder is arranged a thread divider 112, (Figs. 3, 5, 10 and 11) upon a rotatable and longitudinally slidable shaft 113, a tappet 114 (Fig. 5) being mounted fast on the other end of the shaft 113. A lever 115 rotatably arranged upon a pin 116 on the knotting carriage 8, engages with a prism 117 mounted loose upon a pin 118 in the slot of the tappet 114, and carries at the other end a roller 119, which bears on a disc 120 fixedly connected with the toothed wheel 109, so that during the rotation of this disc, by means of a cam groove, not shown, arranged thereon, a longitudinal displacement of the thread divider is produced. A lever 122 (Figs. 3 and 5) oscillatably arranged upon a pin 121 on the knotting carriage 8 is forked at one end, and a pin 123 provided on the tappet 114 engages between the prongs of the fork. The other end of this lever 122 is provided with a roller 124, which bears against the cam groove, not shown, in the disc 120. During a revolution of this disc the thread divider is set in oscillation. On the knotting carriage 8 a rod 125, with a shear cutting plate 126 (Figs. 15 and 16), is so arranged as to be vertically displaceable, and this rod is provided at the other end with a fixedly mounted tappet 127, with a pin 128 and a pivoted tension rod 129. The latter is pivotally connected with a lever 131 oscillatably arranged upon the shaft 130, and with the pin 132. The lever 131 has a roller 133, which engages in a cam groove, not shown, in a disc 134, the cutting plate 126 being moved up and down during a revolution of the said disc. In the bore of the rod 125 there is likewise arranged in a vertically slidable manner a rod 135 similarly provided with a cutting plate 136, a tappet 137 being mounted fast on the other end of the rod 135, and this tappet being pivotally connected by a pin 138 with a tension rod 139. Upon the shaft 130, which is fixedly arranged on the knotting carriage, is mounted an oscillatable lever 140 provided with a roller 141, which engages in a cam groove, not shown, in the disc 134, and during one revolution of the latter the lever 140 pivotally connected with the tension rod 139 by the pin 142 likewise moves the cutting plate 136 up and down in such a way that during the displacement of the two cutting plates 126 and 136, the threads are cut off as if with shears.

The bracket 143 secured to the knotting carriage 8 carries a two-armed lever 145 oscillatably mounted upon a pivot 144, one arm carrying a lever 147 likewise oscillatably mounted upon a pivot 146, as shown in Figs. 3, 5, 17 and 18. The lever 147 comprises a hook needle 148 of tubular construction, which is secured in the lever 147, and in the bore thereof a rod 149 provided with a positioning ring 150 and subjected to the pressure of a spring 151 is longitudinally slidable. The hook needle 148 forms, with the rod 149, a thread gripper. The lever 147, with the roller 148', and the lever 145 with the roller 148'', are connected with one another by a spring 152, by which these rollers are pulled against cam grooves, not shown, in discs 153 and 170. A lever 155 oscillatably mounted upon a pivot 154 on the lever 147 (Figs. 3 and 17) engages with a roller 156 in a cam groove, not shown, in the disc 153, and the hook needle 148 executes a vertical movement and a swinging movement during a revolution of the disc 153, the rod 149 likewise executing a reciprocating movement in the tubular hook needle for the purpose of seizing and clamping the thread and feeding it to the binding bill.

On the knotting carriage is rotatably arranged a binding bill 157 (Figs. 3, 19, 20 and 21), which is fixedly mounted upon a bush 159 provided with teeth 158, a longitudinal rod, with a binding bill 157', being arranged in the bore thereof. The other end of this rod carries a ring 160, and a spring 161 presses the jaws 157 and 157' of the binding bill against one another. A bush 162 is longitudinally slidable upon the stationary ring 160, and a second spring 163 presses a shoulder of this bush against a shoulder on the ring 160 and thereby presses the jaws of the binding bill firmly against one another. The rotating of the binding bill is effected by means of a rack 164 (Figs. 19 and 20), which is arranged on the knotting carriage and which is guided in supports 165 and 166, and is provided with a pin 167 (Fig. 3) carrying a prism 168. The latter engages in the fork of a two-armed lever 169, which is oscillatably mounted upon the shaft 130 and engages with a roller 133' in a cam groove, not shown, in a disc 170. A lever 171 (Fig. 3) oscillatably mounted upon the pivot 144 bears by means of a roller 172 upon the cam groove of the disc 153, the rotating of the binding bill and the opening and closing thereof being effected during a revolution of the discs 170 and 153 by displacement of the binding bill rod, for the purpose of executing the tying of the threads.

A hook needle 172' (Figs. 3, 12 and 22) is mounted in a holder 173, which is secured to a pin 174, and is oscillatably mounted on the knotting carriage, a two-armed lever 175 being oscillatably mounted upon the boss of the knotting carriage, and one arm of the latter lever serving as a tappet for the needle 172. The other arm of the lever 175 is pivotally connected by a pivot 176 with a rack 177 (Figs. 3, 5 and 12). A pin 178 connects the rod 177 with a lever 179 mounted upon a pivot 180 on the knotting carriage, and a roller 181 on this lever bears upon a cam groove, not shown, in a disc 182, and during the revolution thereof, sets the hook needle 172 in oscillation.

To the knotting carriage is secured a bracket 183 (Figs. 3, 5 and 12), in which is supported a shaft 184 carrying a lever 185. The lever 185 engages between a ring 186 mounted fast upon the shaft 174 and the holder 173, a lever 187 being mounted fast upon the other side of the shaft 184, and a pin 188 thereon engaging with a prism 189 in a slot in a lever 190. The latter is oscillatably mounted upon the pivot 130, and engages with a roller 191 in a cam groove, not shown, in a disc 192, which during its revolution imparts to the hook needle 172, besides the above-mentioned oscillating movement, an up-and-down movement for the purpose of seizing the thread, then feeding it to the binding bill, pulling the tied threads out of reach of the knotting implements, and giving them up.

To the knotting carriage is secured a bracket 193 (Fig. 5) in which is supported a shaft 194 carrying a toothed wheel 195. The toothed wheel 195 meshes with a toothed wheel 196 rotatably mounted on the tube holder 85, and an angle 197 secured to the tube holder engages in a groove in the toothed wheel 196 and thereby holds the latter fast axially (Figs. 3, 5, 9, 10 and 11). Upon the other side of the shaft 194 is secured a chain wheel 198, which is connected by a chain 199 with a second chain wheel 200 (Fig. 5) mounted fast upon the boss of the disc 192. During a revolution of the chain wheel 200, a hook 600 (Fig. 10) secured to the toothed wheel 196 executes an oscillating movement and thereby pulls away the cut-off thread ends lying upon the tubes 89, 90, 91 and 92. A stop motion 201 (Figs. 9 and 10) engaging in the warps 76' and 78' is rotatably arranged upon a pin 202 on the tube holder 85, and this stop motion, during the failing of a thread, is pulled by the other of the two threads to be tied on to one side or the other, that is, downwards or upwards, and thereby enables the feeler 27 to shift and put the knotting implements automatically out of operation.

Figure 28:
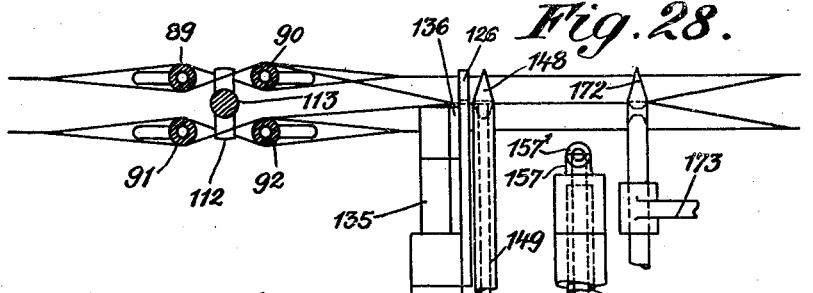
Figure 29:
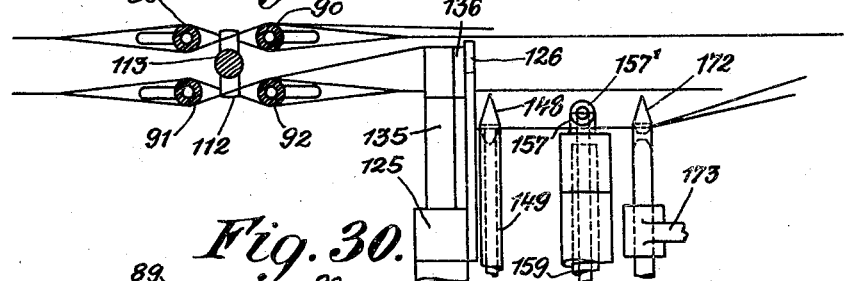
Figure 30:
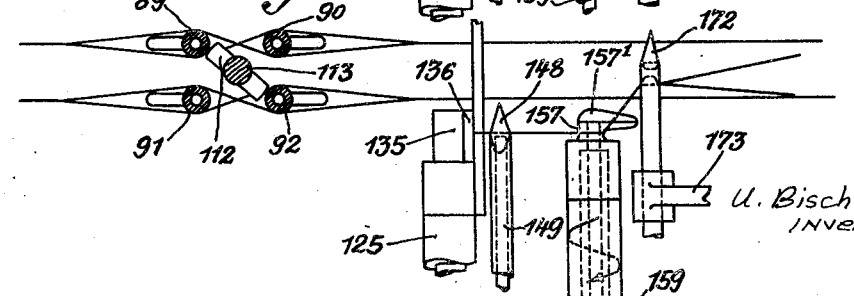
Figure 31:
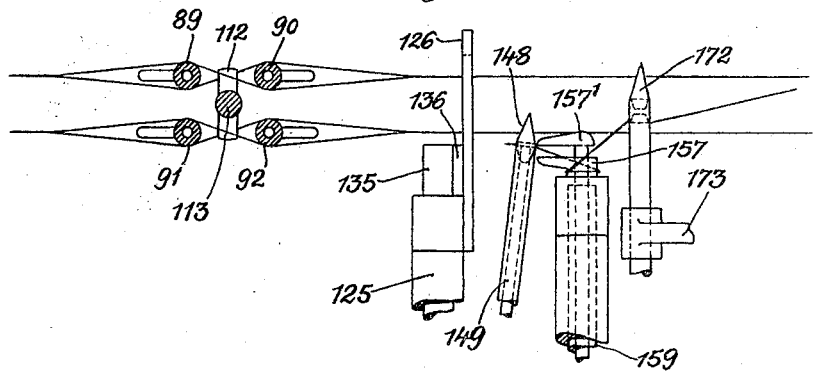
Figure 32:
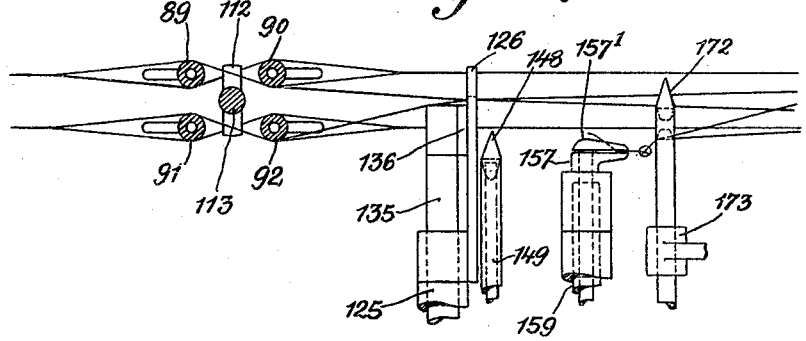

The method of working of the knotting device described, in the sequence of operations that takes place, as follows: The hook needle 148 executes in an upward direction, relatively to the threads 76' and 78' previously taken away from the warp, an upward movement in which the one-sided point of the needle 148 (Fig. 18) guides away the threads rearwards, and, during the further upward movement, the same come to lie between the hook and the rod 149. The rod 149 has previously moved away from the bearing surface of the needle, so that the thread 176', at first slipping under the hook, comes to lie upon the gripping surface of the rod 149, and this rod presses the thread right up into the centre line of the two threads, and then remains stationary in this position until the hook has seized the second thread, as shown in Fig. 13. After this, the thread 78' is drawn downwards by the hook against the first thread 76', and then both threads are firmly gripped by the rod 149 in the hook neck, as shown in Fig. 14. Immediately after this the hook needle 172 likewise executes an upward movement, during which the threads seized and held fast by the needle 148 likewise slip into the hook at the back and are then held by the upper hook, as illustrated in Figure 28. During this operation the shear knife 126, arranged above the warp threads, executes a downward movement against the threads and at the same time also the second shear knife 136 executes an upward movement, during which the two knives, when close together, form shears and cut off the threads, while immediately thereafter the knives move apart again and assume their original position. The two needles 148 and 172 then pull the two gripped threads, held fast by the former into a horizontal position to the rear of the forwardly directed binding bill, downwards into the centre of the neck level of the bill, as illustrated in Figure 28. The binding bill 157 then executes three-quarters of a revolution in the direction of the arrow, the needle 172 pulling the threads forward at right angles in such a way that the projecting part of the binding bill, owing to the rotation that has been effected, comes to stand above the threads, whereupon the needle 172, with the lower hook, pulls the threads upwards, and the latter then assume the upwardly directed oblique position in front of the binding bill, as will be readily seen from Figure 29. The binding bill, which, during this operation, has maintained the position assumed owing to the three-quarter revolution, now again executes half a revolution in the same direction, the needle 148 at the same time executing an oscillating movement towards the binding bill, and thereby delivering the requisite thread for looping round the neck of the bill. During the revolution of the binding bill the same has opened, by the upper jaw member 157' being shifted upwards by its rod, and owing to the rotation of the binding bill the thread ends held by the needle 148 have come to lie between the two jaw members 157 and 157' (Fig. 30), and these ends are now held fast by the binding bill when the jaw members subsequently are closed, while in the mean time a complete winding of the threads round the neck of the bill is effected. The thread ends held fast by the binding bill, as well as by the needle 148, are now released by the latter, whereupon the thread ends during one-third of a backward revolution of the binding bill which now commences, are carried with by the latter. The hook needle 172, which has maintained its position since the upward movement last executed, now oscillates outwards, with the threads lying in the lower hook, whereby the loop of thread previously formed, and lying round the neck of the bill, is pulled away over the bill and the thread end held fast therein, to form a firmly tied knot, as shown in Figures 31 and 32. As soon as the loop has been pulled away over the bill, the bush 162, shown in Fig. 19, is pressed upwards by the lever 171 (Fig. 3) in such a way that its spring 163 is brought out of operation upon the binding bill, whereby after the knot has been pulled tight, the thread ends are easily pulled out of the binding bill. By the further outward swing of the needle 172, the tied threads are drawn out of reach of the knotting implements and laid down, the binding bill passing into its original position in the same backward rotation. It is obvious that owing to this new construction and arrangement of the knotting device an exceedingly reliable method of working is obtained with maximum output capacity, the tying of the threads being effected in different thickness of thread without any alteration or reversal of the knotting implements in a thoroughly reliable manner, so that by the positive operation of tying the threads the disturbances hitherto known are precluded. The arrangement of the ratchet mechanism for displacing the warp and knotting carriages and the device for automatically throwing the knotting device out of action upon the same shaft is a great advantage, whereby a simplification of the machine is obtained.

What I claim is:—

1. In a thread-knotting device, more particularly for joining the ends of the threads of two warps, a rotatable binding bill for tying the threads, comprising a rotatably arranged toothed tube, an axially bored boss fixedly mounted on the toothed tube, a spanner-like jaw rigid with the boss, a rod displaceably arranged in the bore of the boss and the toothed tube, a second spanner-like jaw secured to one end of the displaceable rod and adapted to co-operate with the jaw fixed to the toothed tube to hold the ends of the threads, and two springs of different strengths arranged at the opposite end of the displaceable rod, tending to press the displaceable jaw against the fixed jaw, the springs being adapted to nip the thread securely during the tying and merely to brake the threads lightly after the knotting has been effected, so that the ends of the threads can be drawn out of the binding bill under tension.

2. In a thread-knotting device, more particularly for joining the ends of the threads of two warps, a rotatable binding bill for tying the threads, comprising a rotatably arranged toothed tube, an axially bored boss fixedly mounted on the toothed tube, a spanner-like jaw rigid with the boss, a rod displaceably arranged in the bore of the boss and the toothed tube, a second spanner-like jaw secured to one end of the displaceable rod and adapted to co-operate with the jaw fixed to the toothed tube to hold the ends of the threads, a bush fixed to the end of the displaceable rod remote from the jaw, a weak spring pressing against the said bush and tending to press the displaceable jaw into contact with the fixed jaw, a bush slidably mounted on the fixed bush, a stronger spring pressing against the slidable bush and also tending to press the displaceable jaw into contact with the fixed jaw, and means for moving the slidable bush to eliminate the action of the stronger spring upon the displaceable jaw after the threads have been kotted.

3. In a thread-knotting device, more particularly for joining the ends of the threads of two warps, a rotatable binding bill for tying the threads as claimed in claim 1, and a longitudinally displaceable and rotatable thread gripper adapted to seize and hold fast the thread ends to be tied by the binding bill.

4. In a thread-knotting device, more particularly for joining the ends of the threads of two warps, a rotatable binding bill for tying the threads as claimed in claim 1, a longitudinally displaceable and rotatable thread gripper in the shape of a tubular hook needle closed at the point, a rod longitudinally displaceable in the bore of the hook needle, and means for pressing this rod resiliently against the neck of the hook needle, the hook needle and this rod being adapted to hold threads of any thickness firmly.

5. In a thread-knotting device, more particularly for joining the ends of the threads of two warps, a rotatable binding bill for tying the threads as claimed in claim 1, a longitudinally displaceable and rotatable thread gripper in the shape of a tubular hook needle closed at the point, the point of the hook needle being one-sided and thereby adapted during a longitudinal displacement of the hook needle to guide the threads into the hook thereof, a rod longitudinally displaceable in the bore of the hook needle, and means for pressing this rod resiliently against the neck of the hook needle, the hook needle and this rod being adapted to hold threads of any thickness firmly.

6. A thread-knotting device, more particularly for joining the ends of the threads of two warps, comprising a rotatable binding bill for tying the threads as claimed in claim 1, a longitudinally displaceable and rotatable thread gripper in the shape of a tubular hook needle closed at the point, adapted to seize and hold fast the thread ends to be tied by the binding bill, a second needle arranged approximately in a line with the binding bill and the thread gripper on the side of the binding bill remote from the thread gripper, and an oscillatable and longitudinally displaceable holder for the second needle, this second needle being movable with its holder, and being adapted to seize the thread held by the gripper at a second place on the other side of the binding bill and to deliver it to the binding bill for the tying operation, and being further adapted, after the threads have been knotted, to pull the knotted threads out of reach of the binding bill by its oscillating movement and then let them go.

7. A thread-knotting device, more particularly for joining the ends of the threads of two warps, comprising a rotatable binding bill for tying the threads as claimed in claim 1, a longitudinally displaceable and rotatable thread gripper in the shape of a tubular hook needle closed at the point adapted to seize and hold fast the thread ends to be tied by the binding bill, a second needle arranged approximately in a line with the binding bill and the thread gripper on the side of the binding bill remote from the thread gripper, two hooks facing one another on the same side of this second needle, and an oscillatable and longitudinally displaceable holder for the second needle, this second needle being movable with its holder, and being adapted to seize the thread held by the gripper at a second position on the other side of the binding bill and to deliver it to the binding bill for the tying operation, to displace it to and fro during the tying operation, and, after the threads have been knotted, to pull the knotted threads out of reach of the binding bill by its oscillating movement and then let them go.

8. A thread-knotting device, more particularly for joining the ends of the threads of two warps, comprising a warp carriage, a knotting carriage, a rotatable binding bill for tying the threads as claimed in claim 1, other knotting implements adapted to co-operate with the binding bill, the binding bill and the other knotting implements being mounted upon the knotting carriage, a shaft supported on the knotting carriage, two ratchet mechanisms mounted on the said shaft, one for displacing the knotting carriage and the other for displacing the warp carriage, a clutch lever mounted on the same shaft and adapted to put the knotting implements into and out of operation.

9. A thread-knotting device, more particularly for joining the ends of the threads of two warps, comprising a warp carriage, a knotting carriage, a driving shaft, a rotatable binding bill for tying the threads as claimed in claim 1, other knotting implements adapted to co-operate with the binding bill, the binding bill and the other knotting implements being mounted upon the knotting carriage, a shaft supported on the knotting carriage, two ratchet mechanisms mounted on the said shaft, one for displacing the knotting carriage and the other for displacing the warp carriage, an oscillatable two-armed clutch lever mounted on the same shaft, a clutch member longitudinally displaceable upon the driving shaft, one arm of the clutch lever engaging in the clutch member, a feeler pivoted to the other end of the clutch lever, a guide for the feeler, and a stop motion adapted to co-operate with the feeler for putting the knotting device out of operation.

10. A thread-knotting device, more particularly for joining the ends of the threads of two warps, comprising a warp carriage, a knotting carriage, a driving shaft, a rotatable binding bill for tying the threads, the said binding bill comprising a rotatably arranged toothed tube, an axially bored boss fixedly mounted on the toothed tube, a spanner-like jaw rigid with the boss, a rod displaceably arranged in the bore of the boss and the toothed tube, a second spanner-like jaw secured to one end of the displaceable rod and adapted to co-operate with the jaw fixed to the toothed tube to hold the ends of the threads, a bush fixed to the end of the displaceable rod remote from the jaw, a weak spring pressing against the said bush and tending to press the displaceable jaw into contact with the fixed jaw, a bush slidably mounted on the fixed bush, a stronger spring pressing against the slidable bush and also tending to press the displaceable jaw into contact with the fixed jaw, means for moving the slidable bush to eliminate the action of the stronger spring upon the displaceable jaw after the threads have been knotted, and the thread-knotting device further comprising a longitudinally displaceable and rotatable thread gripper in the shape of a tubular hook needle closed at the point, the point of the hook needle being one-sided and thereby adapted during a longitudinal displacement of the hook needle to guide the threads into the hook thereof, a rod longitudinally displaceable in the bore of the hook needle, means for pressing this rod resiliently against the neck of the hook needle, the hook needle and this rod being adapted to hold threads of any thickness firmly, a second needle arranged approximately in a line with the binding bill and the thread gripper on the side of the binding bill remote from the thread gripper, two hooks facing one another on the same side of this second needle, an oscillatable and longitudinally displaceable holder for the second needle, this second needle being movable with its holder, and being adapted to seize the thread held by the gripper at a second position on the other side of the binding bill and to deliver it to the binding bill for the tying operation, to displace it to and fro during the tying operation, and, after the threads have been knotted, to pull the knotted threads out of reach of the binding bill by its oscillating movement and then let them go, the binding bill, the thread gripper and the needle holder being mounted upon the knotting carriage, a shaft supported on the knotting carriage, two ratchet mechanisms mounted on the said shaft, one for displacing the knotting carriage and the other for displacing the warp carriage, an oscillatable two-armed clutch lever mounted on the same shaft, a clutch member longitudinally displaceable upon the driving shaft, one arm of the clutch lever engaging in the clutch member, a feeler pivoted to the other end of the clutch lever, a guide for the feeler, a stop motion adapted to cooperate with the feeler for putting the knotting device out of operation, feeling levers bearing on the warps, a projection on each of the feeling levers, oscillatably mounted levers engaging at one end under the said projections, tension rods connecting the oscillatably mounted levers with the ratchet mechanisms to set the ratchet mechanisms in operation periodically after the tying of a number of threads so as to displace the knotting and warp carriages, a disc formed with a cam groove therein rotatably mounted on the knotting carriage, and rollers provided on the ratchet mechanisms and adapted to be actuated alternately from the said cam groove.

In testimony whereof I have affixed my signature.

ULRICH BISCHOF.